United States Patent [19]

Fabiano

[11] Patent Number: 4,667,975

[45] Date of Patent: May 26, 1987

[54] HAND-POWERED TOY VEHICLE

[76] Inventor: Stephen Fabiano, 16 West St., West Islip, N.Y. 11795

[21] Appl. No.: 828,009

[22] Filed: Feb. 10, 1986

[51] Int. Cl.⁴ .................... B62M 1/14; A63H 17/25
[52] U.S. Cl. .................... 280/211; 280/1.13; 280/230; 280/246; 280/255; 280/264; 446/465
[58] Field of Search .......... 280/211, 242 R, 244, 280/245, 246, 247, 248, 252, 253, 256, 257, 264, 1.11 R, 1.13, 210; 446/440, 450, 451, 457, 465

[56] References Cited

U.S. PATENT DOCUMENTS

| 296,937 | 4/1884 | Davies | 280/253 |
|---|---|---|---|
| 318,725 | 5/1885 | Hall | 280/253 |
| 413,104 | 10/1889 | Saxton | 280/246 |
| 724,296 | 3/1903 | Kapus | 280/247 |
| 862,459 | 8/1907 | Ferris | 280/246 |
| 863,759 | 8/1907 | Russell | 280/246 |
| 875,748 | 1/1908 | Thayer | 280/246 |
| 879,947 | 2/1908 | Crecelius | 280/246 |
| 1,252,430 | 1/1918 | Gruenberg | 280/247 |
| 1,714,283 | 5/1929 | Stilson | 280/246 |
| 2,251,005 | 7/1941 | Rubinich | 280/256 |
| 2,837,342 | 6/1958 | Kirk | 280/211 |
| 3,452,998 | 7/1969 | Carr | 280/1.11 A |

FOREIGN PATENT DOCUMENTS 729962 8/1932 France ................... 280/246

Primary Examiner—John J. Love
Assistant Examiner—Everett G. Diederiks, Jr.
Attorney, Agent, or Firm—Nolte, Nolte and Hunter

[57] ABSTRACT

A hand-powered toy vehicle with a pair of levers coupled to independent rear wheels. The levers can be operated together to accelerate forward movement of the vehicle, as well as to brake it. The levers also can be used to rotate one of rear wheels faster forwardly than the other in order to turn the vehicle. Each lever is connected to one of the wheels through disengageable drive and driven gears with a saw-tooth configuration which permits forward rotation of the drive gear to be transmitted to the driven gear and the wheel to accelerate forward rotation of the wheel. To brake forward rotation of the wheels, the levers can be used to rotate the drive gears rearwardly and force the drive and driven gears to mesh and lock.

6 Claims, 9 Drawing Figures

HAND-POWERED TOY VEHICLE

BACKGROUND OF THE INVENTION

This invention relates to a hand-powered toy vehicle for children. This invention particularly relates to a toy vehicle which is both propelled and steered, as well as braked, by a pair of independent hand-operated levers.

Vehicles powered by hand-operated levers are well known. See, for example, U.S. Pat. Nos. 296,937, 318,725, 862,459, 863,759, 875,748, 879,947, and 1,714,283. The levers of such vehicles have been adapted to rotate the vehicle's rear wheels but not to steer the vehicles. For this reason, separate hand-operated or foot-operated steering mechanisms have had to be connected to the front wheels of such vehicles. As a result, it has been difficult for young uncoordinated children to both steer and propel these vehicles.

There has been a need, therefore, for a simple toy vehicle which can be both steered and propelled by levers that are mechanically coupled to its wheels to provide young uncoordinated children with the fun of driving a moving vehicle, as well as beneficial physical exercise and training in coordinating their hand movements.

SUMMARY OF THE INVENTION

In accordance with this invention, a hand-powered toy vehicle is provided comprising:

platform means for supporting a rider;

a first and a second main wheel assembly disposed on opposite lateral sides of said platform means and including first and second respective wheels which are rotatable about a common, laterally extending, horizontal axis during movement of said vehicle;

a first lever-operated drive means on said platform means mechanically coupled to said first wheel for accelerating forward rotation of said first wheel and a second lever-operated drive means on said platform means mechanically coupled to said second wheel for accelerating forward rotation of said second wheel; said first and second drive means being separate and imparting forward rotation independently to said first and second wheels, respectively, whereby said first and second drive means comprise means for imparting different rates of forward rotation to said first and second wheels, respectively, for turning said vehicle; and at least a third wheel assembly including a third wheel, means mounting said third wheel for free rotation about a horizontal axis and pivot means connecting said mounting means of said third wheel to said platform means for free rotation about a vertical axis in response to a turning of said vehicle caused by a difference in the rate of forward rotation of said first and second wheels; said third wheel being disposed longitudinally away from said common axis of said first and second wheels to support vertically said platform means.

This vehicle can easily be both propelled and steered by a child using the lever-operated drive means.

In a preferred embodiment of the vehicle, each of the lever-operated drive means is also adapted to decelerate forward rotation of the wheel, to which it is mechanically coupled, so that the child can also brake the vehicle.

DETAILED DESCRIPTION OF THE PREFERRED EMBODIMENT

Figure 1:
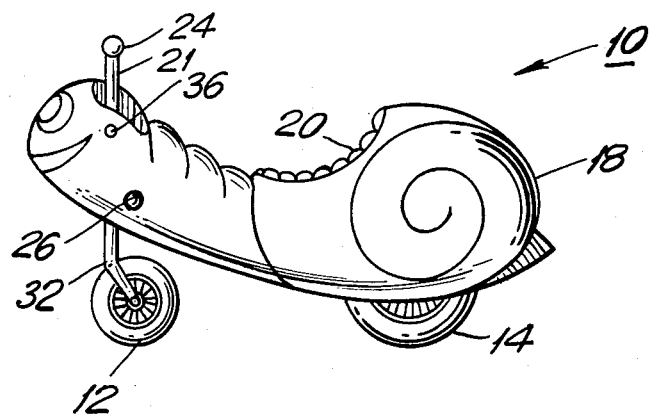
FIG. 1 is a side elevation view of a hand-powered toy vehicle of this invention; the vehicle is decorated to resemble a snail on which a child can sit.
Figure 3:
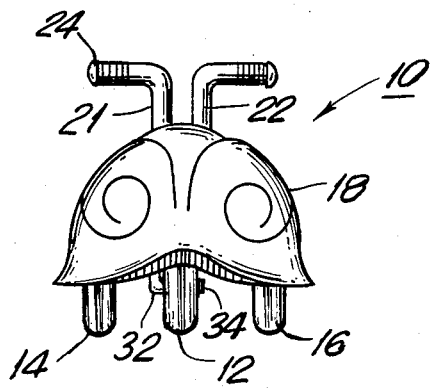
FIG. 3 is a rear elevation view of the toy vehicle of FIG. 1.
Figure 2:
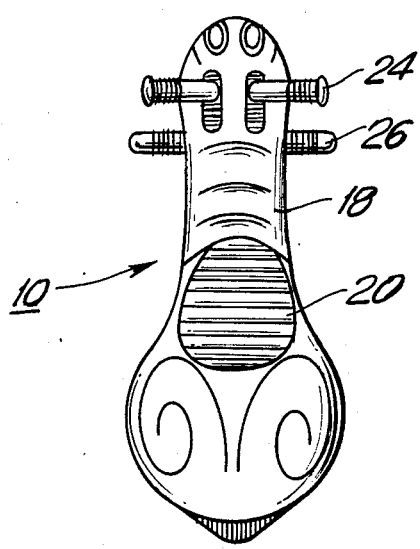
FIG. 2 is a top plan view of the toy vehicle of FIG. 1.

Shown in FIGS. 1 to 9 is a hand-powered toy vehicle of this invention, generally 10. The vehicle 10 includes a front wheel 12, a pair of rear wheels 14 and 16, and a light-weight rigid plastic body 18. On top of the body 18 is a platform or seat 20 for supporting a child using the vehicle, and a pair of upstanding levers 21 and 22 extend outwardly from the top of the body 18 in front of the seat 20. The seat 20 is preferably located between the rear wheels 14 and 16 and somewhat in front of them. Each of the levers 21 and 22 has a laterally extending handle 24 at its top which can be grasped and moved forward and rearward by one hand of a child seated on the seat 20. The bottom of each lever 21 or 22 is mechanically coupled to one of the rear wheels 14 and 16, respectively, as discussed below. Preferably, a pair of laterally extending foot rests 26 for the feet of the child are provided on laterally opposite sides of the body 18 in front of the seat 20.

Figure 4:
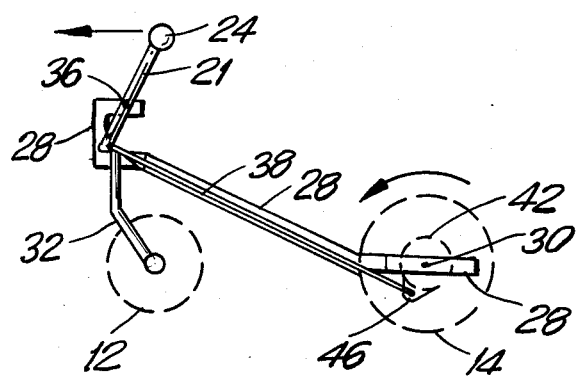
FIG. 4 is schematic side elevation view of the vehicle of FIG. 1 with its decorated body removed to show its frame, the connection of its frame to its wheels (shown in phantom) and the mechanical connection of one of its hand-operated levers to a gear for driving one of its rear wheels.
Figure 5:
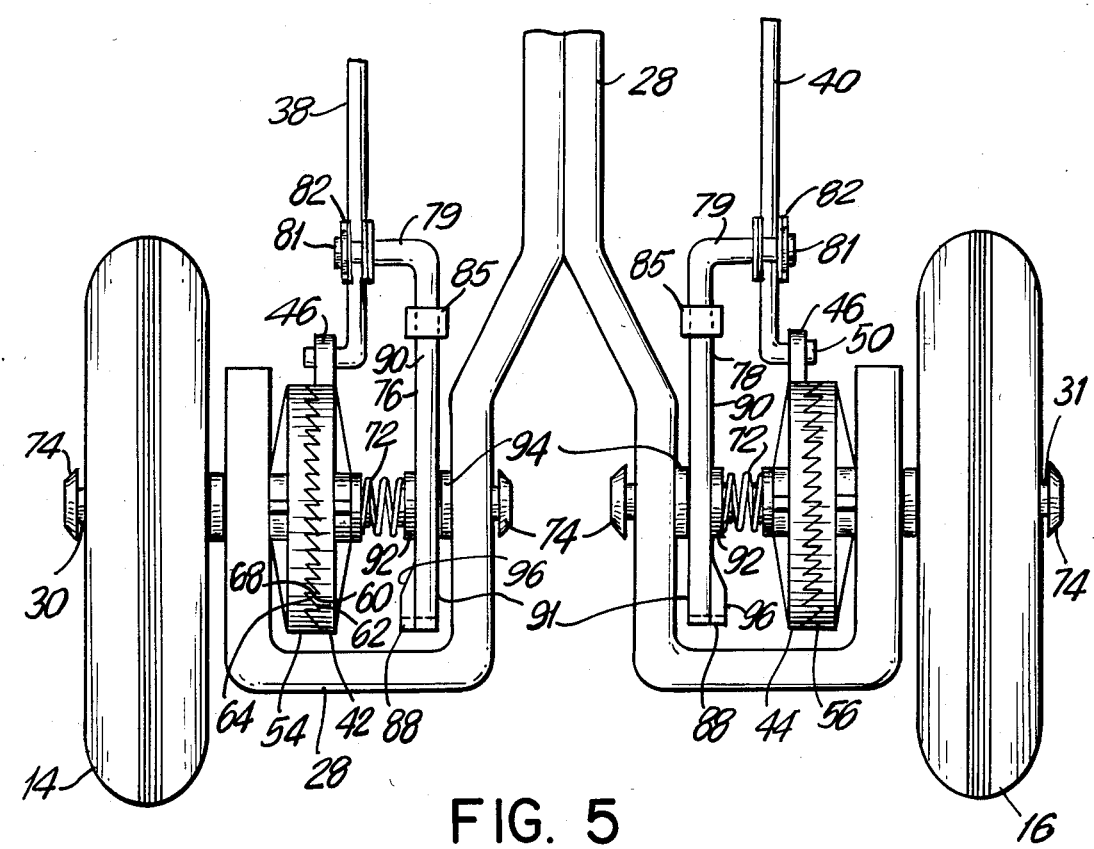
FIG. 5 is a schematic top plan view of a pair of combination drive and brake mechanisms of the vehicle of FIG. 1, showing the mechanical connection of these mechanisms to the rear of the vehicle's frame and to its pair of rear wheels.

As shown in FIGS. 4 and 5, a rigid plastic or metal frame 28 is provided within the body 18 of the vehicle 10. The frame 28 can suitably be a conventional tubular member which extends symmetrically about the longitudinal axis of the vehicle 10 from its front to its rear and supports the body 18 and its seat 20. Rotatably mounted on the rear of the frame 28 are separate tubular rear axles 30 and 31 for the rear wheels 14 and 16, respectively. The rear axles 30 and 31 extend laterally through separate bifurcated rear portions of the frame 28 and along a common horizontal axis, about which the rear wheels 14 and 16 can freely rotate independently.

Figure 6:
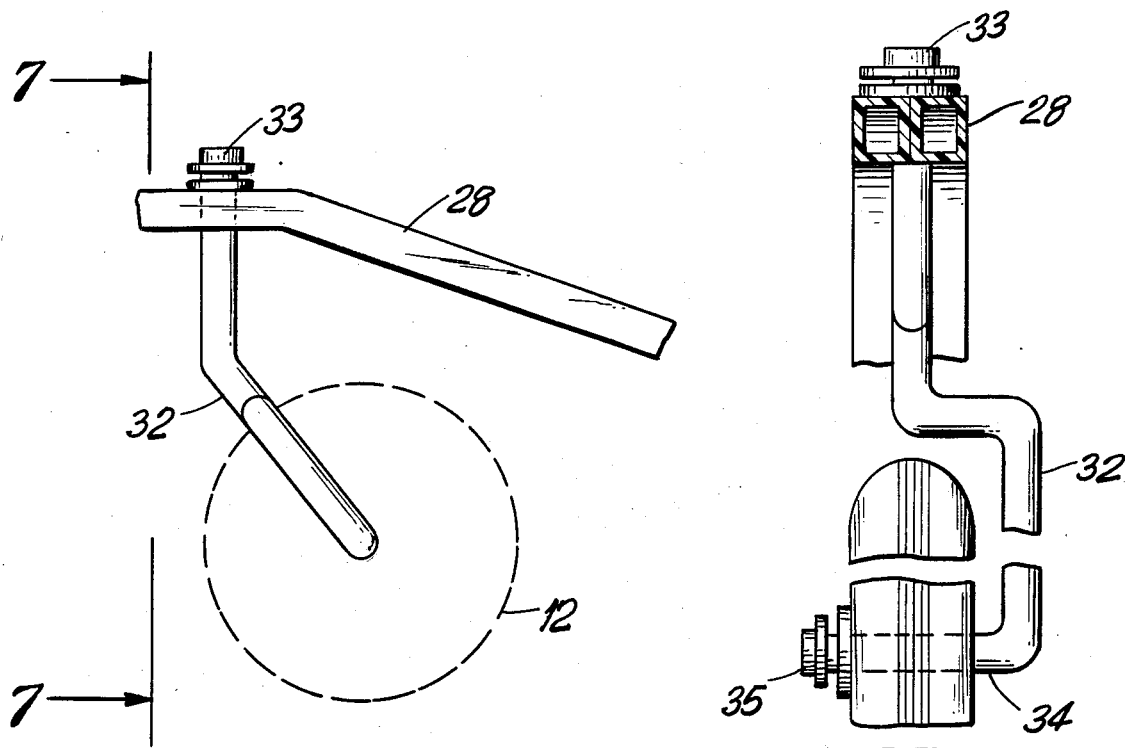
FIG. 6 is a schematic side elevation view of the connection of the front wheel (shown in phantom) to the frame of the vehicle of FIG. 1.
Figure 7:
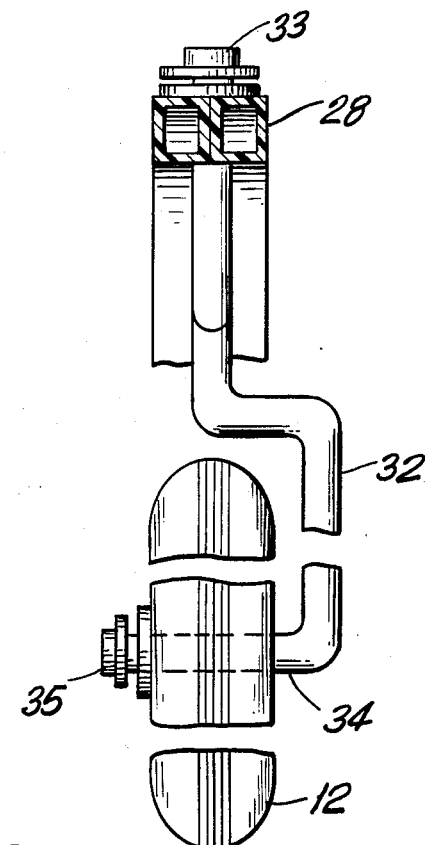
FIG. 7 is a sectional view, taken along line 7—7 in FIG. 6, showing the connection of the front wheel to the frame of the vehicle of FIG. 1.

As shown in FIGS. 6 and 7, an upstanding tubular front support 32 extends upwardly through the front portions of the frame 28 and is held on the frame with a conventional hammer nut 33 inserted into the top of the front support 32, so that the front support 32 can rotate freely about its vertical axis. The bottom of the front support 32 extends rearwardly and is connected to one end of a horizontal tubular front axle 34, about which the front wheel 12 can freely rotate. A hammer nut 35 is mounted on the free other end of the front axle 34 to hold the front wheel 12 thereon. As seen from FIGS. 1 and 6, the center of the front wheel 12 is located to the rear of the pivotal connection of the frame 28 and the front support 32 so that the front wheel 12 can automatically turn laterally in response to lateral turning of the front of the vehicle 10 caused by any difference in the rate of forward rotation of the rear wheels 14 and 16.

As shown in FIGS. 1-4 and 9, the levers 21 and 22 are located on opposite lateral sides of the vehicle 10 and are pivotally connected to the body 18 and the frame 28 by a common laterally extending pin 36 through these members. The location of the pin 36 along the length of the levers 21 and 22 is not believed critical. However, it is preferred that the pin 36 extend through the levers 21 and 22 at about the middle thereof.

Figure 8:
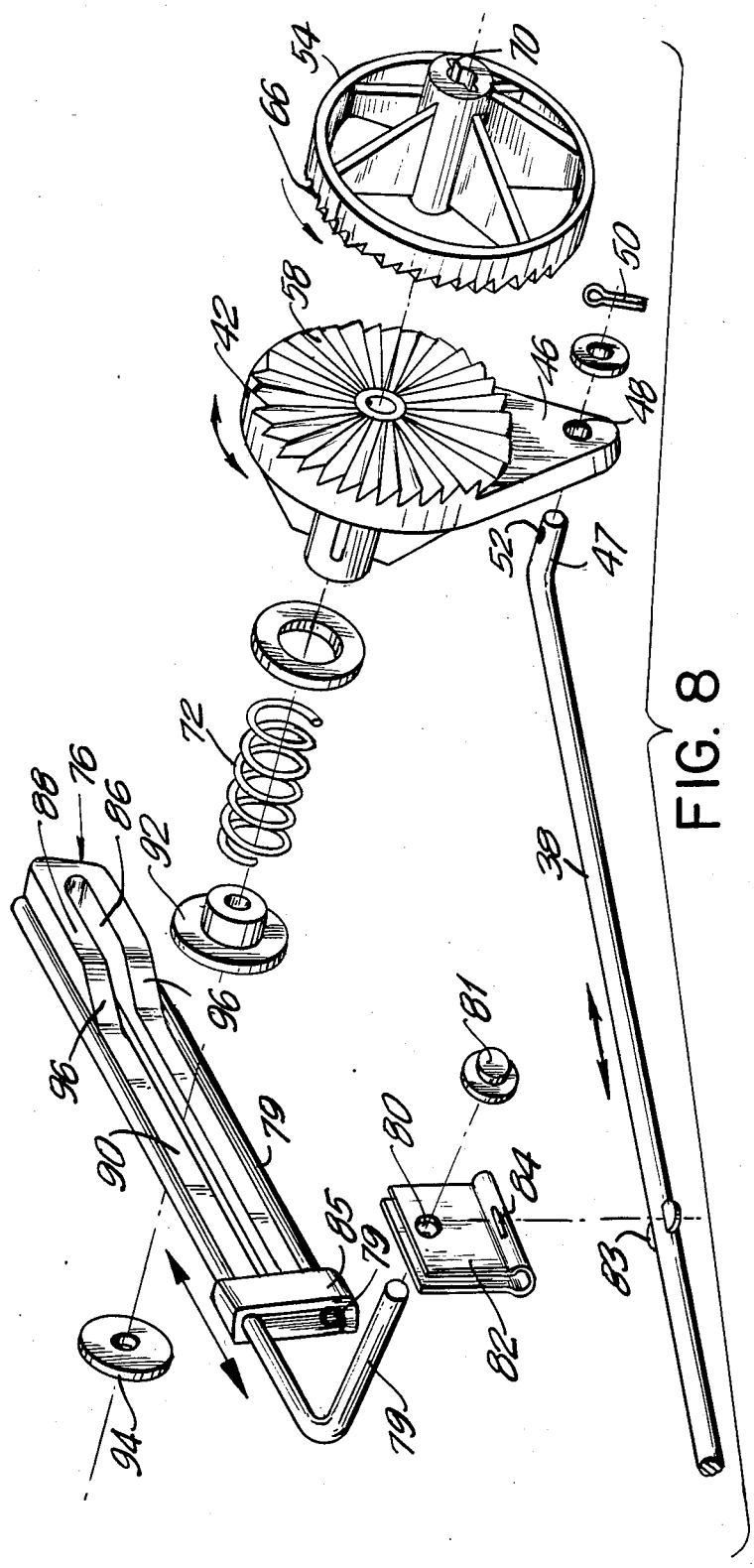
FIG. 8 is an exploded schematic perspective view of one of the combination drive and brake mechanisms which is connected to one of the hand-operated levers and one of the rear wheels of the vehicle of FIG. 1.
Figure 9:
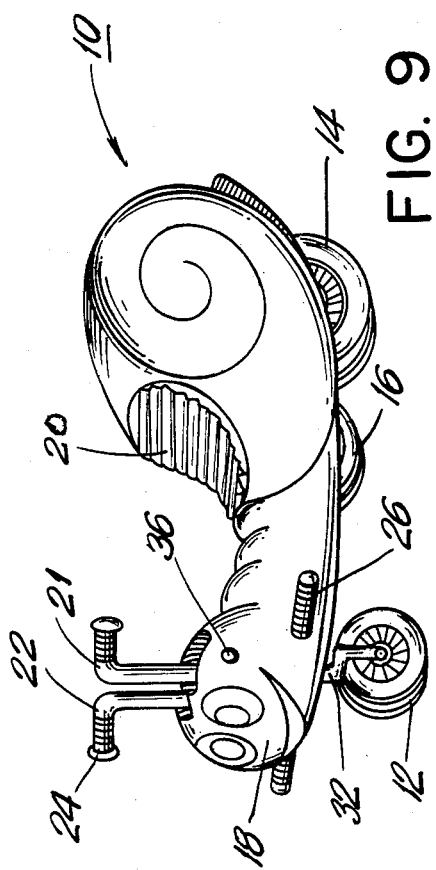
FIG. 9 is a perspective view of the toy vehicle of FIGS. 1–8.

As shown in FIGS. 4 and 5, the bottom of each of the levers 21 and 22 is pivotally connected to the front of one of a pair of longitudinally extending, actuator rods 38 and 40, respectively, on opposite lateral sides of the vehicle 10 between the rear wheels 14 and 16. As described below, the rear of each actuator rod 38 or 40 is pivotally connected to one of a pair of drive gears 42 and 44, respectively, that are located between the rear wheels 14 and 16 on opposite lateral sides of the vehicle 10 and that are rotatably mounted on the rear axles 30 and 31, respectively. As also described below, each drive gear 42 or 44 can be used to accelerate forward rotation of the rear wheel 14 or 16 on the same rear axle 30 or 31 when the actuator rod 38 or 40, connected to the drive gear 42 or 44, is moved rearwardly by moving forward the handle 24 of the lever 21 or 22 connected to that actuator rod. As shown in FIGS. 4, 5 and 8, each drive gear 42 or 44 has a downwardly extending projection 46 on its circumference, and on the rear of each actuator rod 38 or 40 is a laterally extending arm 47. Each actuator rod arm 47 extends through a laterally extending hole 48 in the projection 46 on its adjacent drive gear 42 or 44 and is held in the hole 48 by means of a conventional cotter pin 50 inserted through a hole 52 in the actuator rod arm 47.

As shown in FIGS. 5 and 8, a pair of driven gears 54 and 56 are also provided between the rear wheels 14 and 16 on opposite lateral sides of the vehicle 10 on the rear axles 30 and 31, respectively. Each driven gear 54 or 56 meshes with one of the drive gears 42 and 44, respectively, and is preferably located between its drive gear 42 or 44 and the adjacent rear wheel 14 or 16. The drive gears 42 and 44 have a saw-tooth configuration that closely meshes with the saw-tooth configuration of the adjacent driven gears 54 and 56. In this regard, it is preferred that the drive gear teeth 58 each have a laterally extending front face 60 and a rear face 62 which is at an acute angle to the front face 60 and that the corresponding front face 64 of each driven gear tooth 66 is at about the same acute angle as the rear face 62 of each drive gear tooth 58 and the rear face 68 of each driven gear tooth 66 extends laterally. With this saw-tooth configuration, the driven gear teeth 66 tend to stay meshed with the drive gear teeth 58 when the drive gears 42 and 44 are rotating forwardly (as in FIG. 4) at least as fast as the driven gears 54 and 56, and the drive gear teeth 58 tend to become disengaged from the driven gear teeth 66 when the driven gears are rotating forwardly faster than the drive gears.

As also seen from FIGS. 5 and 8, each rear wheel 14 or 16 and its respective adjacent drive gear 42 or 44 and driven gear 54 or 56 are located on one of the rear axles 30 and 31, respectively, so that they can rotate about the common horizontal axis of the rear wheels. Preferably, the rear wheels 14 and 16 and their driven gears 54 and 56 are attached to, and rotate with, their respective rear axles 30 and 31. For this purpose, keyways 70 are provided in the hubs of the driven gears 54 and 56 and rear wheels 14 and 16, and mating keys (not shown) are provided in their rear axles 30 and 31. However, the drive gears 42 and 44 can rotate freely about their rear axles 30 and 31 under the control of their respective actuator rods 38 and 40. A laterally extending spring 72 is located on each rear axle 30 and 31 adjacent the drive gear 42 or 44 on the same axle. Each spring 72 is biased against its adjacent drive gear 42 or 44 so as to urge the drive gear teeth 58 into engagement with the adjacent driven gear teeth 66. Conventional hammer nuts 74 are mounted on the lateral ends of the rear axles 30 and 31 to hold the rear wheels 14 and 16, the gears 42, 44, 54 and 56, the springs 72, and the rear portions of the frame 28 on the rear axles 30 and 31.

With this arrangement, the rear wheels 14 and 16 can be rotated forwardly together about their common horizontal axis to propel the vehicle 10 forwardly by simply pushing the handles 24 on top of the levers 21 and 22 forwardly from their upright position so that: (a) the levers 21 and 22 pivot about the pin 36; (b) the bottom of the levers 21 and 22, the actuator rods 38 and 40 and the projections 46 on the drive gears 42 and 44 move rearwardly together; (c) the drive gears 42 and 44 rotate forwardly about the rear axles 30 and 31; (d) the driven gears 54 and 56 rotate forwardly with the drive gears 42 and 44; (e) the rear axles 30 and 31 rotate forwardly with the driven gears 54 and 56; and (f) the rear wheels 14 and 16 rotate forwardly with the rear axles 30 and 31. The handles 24 on the levers 21 and 22 can be repeatedly pushed forwardly from the upright positions of the levers to accelerate forward rotation of the rear wheels 14 and 16. During such acceleration, the drive gears 42 and 44 rotate rearwardly when the handles of the levers are pushed rearwardly back to the upright positions of the levers, between forward pushes, while the driven gears 54 and 56 continue to rotate forwardly with the rear axles 30 and 31 and rear wheels 14 and 16. The forward rotation of each driven gear 54 or 56 causes it to overrun its rearwardly rotating, adjacent drive gear 42 or 44 and to urge its drive gear to move laterally towards the adjacent spring 72, thereby disengaging the drive and driven gears. When the handles of the levers are again pushed forwardly, each drive gear 42 or 44 rotates forwardly to re-engage, and accelerate the forward rotation of, its driven gear 54 or 56.

In accordance with this invention, a child can steer the vehicle 10 using only the levers 21 and 22. By pushing the handle 24 of one lever 21 or 22 forwardly to impart a greater rate of forward rotation to the rear wheel 14 or 16 connected to the one lever, the vehicle 10 can be turned in a direction away from the one lever and its rear wheel. In this regard, the front wheel 12 will follow any lateral movement of the front of the vehicle and therefore need not be separately controlled by the child. As a result, a child can both propel and steer the vehicle 10 simply by controlling with his hands the forward motion that he imparts at any time to the handles 24 of the respective levers 21 and 22 and that is transmitted to the respective rear wheels 14 and 16.

As best shown in FIGS. 5 and 8, a pair of longitudinally extending, brake members 76 and 78 are preferably provided between the rear wheels 14 and 16 and on opposite lateral sides of the vehicle 10. Mounted on the front of each brake member 76 or 78 is an arm 79 which extends laterally toward the adjacent rear wheel 14 or 16. Each brake member arm 79 extends through a laterally extending hole 80 in the top of a bracket 82 and is held there by a hammer nut 81 mounted on the end of the arm 79. The top of each bracket 82 can pivot longitudinally about its brake member arm 79, and the bottom of each bracket holds the adjacent actuator rod 38 or 40. Preferably, a pair of laterally extending ears 83 are crimped into each actuator rod 38 or 40 that engage a pair of slots 84 in each bracket 82 to hold the bracket longitudinally in place on the actuator rod, so that each brake member 76 or 78 moves longitudinally with its adjacent actuator rod. Also, each brake member arm 79 preferably comprises a rigid metal rod which is held on the top, bottom and rear of its brake member 76 or 78 by a clamp 85 on the front of its brake member.

As shown in FIG. 8, each brake member 76 or 78 also includes a slot 86 which extends laterally through it and longitudinally from about its front to its rear. Each rear axle 30 or 31 extends through the slot 86 in one of the brake members 76 and 78, respectively. The slot 86 in each brake member 76 or 78 has a width and length sufficient to accomodate both: (a) rotation of its rear axle 30 or 31 with its adjacent driven gear 54 or 56; and (b) longitudinal sliding movement of its rear axle when the brake member 76 or 78 is moved longitudinally relative to its rear axle upon forward or rearward movement of the actuator rod 38 or 40 connected to the brake member. The rear of each brake member 76 or 78 also has a laterally enlarged portion 88 that extends towards its adjacent rear wheel 14 or 16. Each brake member 76 or 78 also has a pair of longitudinally extending, smooth, outer and inner surfaces 90 and 91, respectively, on its opposite lateral sides about its slot 86. A pair of smooth surfaced washers 92 and 94 are provided on each of the rear axles 30 and 31 adjacent the outer and inner surfaces 90 and 91, respectively, of each brake member 76 or 78. Each outer washer 92 is biased by the spring 72 in each rear axle 30 or 31 against the outer surface 90 of the adjacent brake member 76 or 78 so that each outer surface 90 can easily slide longitudinally relative to its adjacent spring 72. Each inner washer 94 is located between the frame 28 and the inner surface 91 of the adjacent brake member 76 or 78 to facilitate longitudinal sliding movement of the brake member 76 or 78 relative to the frame 28.

In accordance with this invention, the laterally enlarged rear portion 88 of each brake member 76 or 78 is adapted to urge its adjacent outer washer 92 to move laterally along its rear axle 30 or 31 towards its adjacent rear wheel 14 or 16 when the outer washer 92 is moved longitudinally along the outer surface 90 of the brake member towards the rear of the brake member. In this regard, the rear portions of each outer surface 90 on each brake member 76 or 78, where they extend laterally toward the adjacent rear wheel 14 and 16, act as a cam surface 96 for each adjacent outer washer 92. Each cam surface 96 can urge its adjacent outer washer 92 laterally outward so as to: (a) completely compress its adjacent spring 72 laterally between its adjacent outer washer 92 and drive gear 42 or 44; (b) urge its driven gear to move along its rear axle 30 or 31 laterally outward against its adjacent driven gear 54 or 56; (c) force the teeth 58 and 66 of its drive and driven gears to mesh and lock and thereby prevent them from disengaging even though the drive gear had been rotating rearwardly and the drive gear had been rotating forwardly; and (d) thereby brake the forward rotation of its driven gear, rear axle, and rear wheel 14 or 16. Thus, forward movement of the vehicle 10 can be braked simply by pulling the handles 24 of both levers 21 and 22 rearwardly from their upright position so as to: (a) move the actuator rods 38 and 40 forwardly; (b) cause the drive gears 42 and 44 to rotate rearwardly; (c) cause the brake members 76 and 78 to move forwardly with the brackets 82 holding the actuator rods so that the rear axles 30 and 31 slide within the slots 86 toward the enlarged rear portions 88 of the brake members; and (d) thereby cause the cam surface 96 on the rear portions of each brake member to urge its adjacent outer washer 92 and drive gear 42 or 44 to move laterally outwardly on its rear axle 30 or 31 toward its adjacent rear wheel 14 or 16, whereby each rearwardly rotating drive gear 42 or 44 is forced against its adjacent forwardly rotating driven gear 54 or 56, so that the gears mesh and lock and forward rotation of the driven gear, its rear axle and its rear wheel is braked.

It is thought that this invention and many of its attendant advantages will be understood from the foregoing description, and it will be apparent that various changes can be made in the hand-operated toy vehicle 10 without departing from the spirit and scope of the invention or sacrificing all of its material advantages, the embodiment hereinbefore described being merely a preferred embodiment. In this regard, terms such as "front", "rear", "lateral", "longitudinal", "top", and "bottom" are used simply as relative terms to describe the vehicle 10 of FIGS. 1–9.

I claim:

1. A hand-powered toy vehicle comprising:
    platform means for supporting a rider;
    a first and a second main wheel assembly disposed on opposite lateral sides of said platform means and including first and second respective wheels which are rotatable about a common, laterally extending, horizontal axis during movement of said vehicle;
    a first lever-operated drive means on said platform means mechanically coupled to said first wheel for accelerating and decelerating forward rotation of said first wheel and a second lever-operated drive means on said platform means mechanically coupled to said second wheel for accelerating and decelerating forward rotation of said second wheel; said first and second drive means being separate and imparting forward rotation independently to said first and second wheels, respectively, whereby said first and second drive means comprise means for imparting different rates of forward rotation to said first and second wheels, respectively, for turning said vehicle; and
    at least a third wheel assembly including a third wheel, means mounting said third wheel for free rotation about a horizontal axis and pivot means connecting said mounting means of said third wheel to said platform means for free rotation about a vertical axis in response to a turning of said vehicle caused by a difference in the rate of forward rotation of said first and second wheels; said third wheel being disposed longitudinally away from said common axis of said first and second wheels to support vertically said platform means; and wherein each of said lever-operated drive means comprises:

an upstanding lever that is pivotally connected to the vehicle; the top of the lever being adapted to be grasped and moved longitudinally;

a longitudinally extending actuator rod pivotally connected at its front to the bottom of the lever so as to move longitudinally with the bottom of the lever;

a drive gear that is rotatable about the common axis of the first and second wheels and is pivotally connected to the rear of the actuator rod so as to rotate with longitudinal movement of the actuator rod;

a driven gear which is rotatable about the common axis of the first and second wheels; the teeth of the drive gear and driven gear extending towards one another and being adapted to mesh with one another when the drive gear rotates in a forward direction about the common axis of the first and second wheels; the driven gear being connected to said first or second wheel so that said first or second wheel rotates forwardly with forward rotation of said driven gear; and spring means along the common axis of the first and second wheels urging the teeth of the drive and driven gears to mesh; and wherein each of said lever-operated drive means also comprises:

a longitudinally extending brake member which is connected to the actuator rod of the drive means and which moves longitudinally with the actuator rod; the brake member having a cam surface that extends laterally toward the drive gear and is located adjacent one of the longitudinal ends of the brake member; the cam surface being located on the brake member so that longitudinal movement of the actuator rod, which causes rearward rotation of the drive gear, also causes the cam surface of the brake member to move toward the common axis of said first and second wheels; and the spring member being biased against the one lateral side of the brake member; whereby longitudinal movement of the actuator rod, which causes rearward rotation of the drive gear and moves the cam surface of the brake member longitudinally to a position along the common axis of said first and second wheels, also causes the cam surface to urge the spring member toward the drive and driven gears so as to force their teeth to mesh and thereby brake the forward rotation of the driven gear and said first or second wheel.

2. The toy vehicle of claim 1, wherein the teeth of the drive gear and the driven gear have a saw-tooth configuration which causes the teeth of the drive and driven gears to tend to become disengaged when the driven gear rotates faster forwardly then the drive gear.

3. The toy vehicle of claim 2, wherein each tooth of the drive gear has a laterally extending front face and a rear face which is at an acute angle to the front face and each tooth of the driven gear has a front face which is at about the same acute angle has the rear face of the drive gear and a rear face which extends laterally.

4. The toy vehicle of claim 1 wherein the front of the brake member has an arm extending laterally towards said first or second wheel and connected to the actuator rod so that the arm can pivot longitudinally about its connection to the actuator rod.

5. The toy vehicle of claim 4 wherein the arm comprises a rigid metal rod held on the top, bottom and rear of the brake member.

6. The toy vehicle of claim 1 wherein the drive gear, the driven gear and said first or second wheel rotate about a common axle which extends laterally through a longitudinally extending slot in the brake member and the cam surface, whereby the slot can be moved longitudinally relative to the axle and the axle can rotate within the slot.

* * * * *